Patented Oct. 26, 1943

2,332,974

UNITED STATES PATENT OFFICE 2,332,974

HALOGENATED VINYL COMPOUND

Marion R. Lytton, Wilmington, and Robert J. Taylor, Claymont, Del., assignors to American Viscose Corporation, Wilmington, Del., a corporation of Delaware No Drawing. Application July 22, 1941, Serial No. 403,530

10 Claims. (Cl. 260—86)

This invention relates to novel vinyl resin masses particularly adapted for making filaments suitable for the manufacture of textile staple fibers, yarns, and fabrics.

It has previously been proposed to employ halopolyvinyl chloride resins and co-polymers of vinyl chloride and vinyl acetate for the manufacture of various artificial masses including filaments. However, the use of such resins of this type as have had a suitable solubility produced filaments having relatively low shrinkage temperatures, generally in the neighborhood of from about 65° C. to 85° C. Herein, shrinkage temperature refers to the 5° C. range of temperature through which 5% or more shrinkage occurs as a filament is subjected to gradually increasing temperatures. Depending upon the particular resin and the particular procedure followed in making the filament therefrom, the softening and complete fusion of the resin filament occurs more or less closely after the shrinkage range is surpassed.

It has been suggested to polymerize these vinyl resins to a higher degree to obtain higher shrinkage temperatures, but it has been found that this has too little influence upon the shrinkage temperatures of resins having molecular weights of the order of 15,000 or higher and renders them insoluble in the usual solvents employed in spinning such resins. For example, doubling the molecular weight of a vinyl co-polymer containing 90% by weight of vinyl chloride and 10% of the acetate from 20,000 to 40,000 raises the shrinkage temperature by only about 5° C. and renders it insoluble in acetone, chloroform, etc. in which the resin of lower molecular weight is soluble.

In accordance with United States Patent 1,982,765, the straight polyvinyl chloride resins have been halogenated to increase their strength without sacrifice of solubility. The procedure of this patent involves a step of depolymerization or the use of resins having a low degree of polymerization as the starting material and the halogenated resin products still retained relatively low shrinkage temperatures.

French Patent 828,077 discloses that in order to raise the softening temperature of polyvinyl chloride resins having a high degree of polymerization above 100° C., it is necessary to raise the chlorine content up to at least 64%. While this patent suggests broadly the manufacture of artificial silk resistant to boiling from the resins disclosed therein, any such manufacturing procedure would be attended by the difficulties associated with the poorer solubilities of such resins as compared with those disclosed in United States Patent 1,982,765.

In accordance with British Patent 517,689, it has been proposed to halogenate shaped masses, such as threads, of polyvinyl chloride, of halogenated polyvinyl chloride, or of the co-polymer of vinyl chloride and vinyl acetate in order to raise the shrinkage temperatures of such masses. Such processes succeeded in elevating the shrinkage temperature ranges of polyvinyl chloride and halogenated polyvinyl chloride masses to within the range of 85° C. to about 95°–100° C. and in raising the shrinkage temperature of co-polymers of vinyl chloride and vinyl acetate to about 80° C. Although some improvement results from the employment of this process, the shaped masses so treated still have the serious disadvantage of shrinkage at temperatures below 100° C., thereby preventing the handling or treatment of such materials in boiling water, and the process has the further disadvantages of requiring excessively long times of treatment with chlorine gas or other source of halogenating agent and of producing articles lacking homogeneity characteristic of superficially treated masses.

It has now been found that the co-polymers of vinyl chloride with vinyl acetate having molecular weights of 15,000 or higher can be halogenated to produce resin masses having shrinkage temperature ranges above the boiling point of water, that is above 100° C., and having improved solubility without any appreciable depolymerization or degradation. Solutions of the halogenated co-polymers may be made of higher concentration and still show less tendency to gel than solutions of ordinary co-polymers, thereby facilitating filtration and transportation through pipe lines. In addition, such halogenated co-polymers can be converted into filaments having greater strength and extensibility than the straight polyvinyl chloride resins, whether halogenated or not, and having less cold flow than unhalogenated co-polymers. These improved properties are especially advantageous in connection with the manufacture of filaments in the manner hereinafter described.

Surprisingly, the co-polymers of suitable high molecular weight to adapt them to the manufacture of filaments need not be halogenated as high as 64% before the shrinkage temperature is raised above 100° C. The extent of halogenation needed to achieve this result depends mainly upon the proportions between the vinyl chloride and vinyl acetate units in the resin as well as upon the molecular weight thereof, though the latter factor has by far the lesser influence as stated above. As examples illustrative of the relatively low degree of halogenation needed to raise the shrinkage temperatures to the range from 100°–105° C., a chlorinated co-polymer containing 80% by weight of polyvinyl chloride and 20% by weight of polyvinyl acetate should contain about 58% chlorine; a chlorinated co-polymer containing 88% by weight of polyvinyl chloride should contain 58½% chlorine; a chlorinated co-polymer containing 90% by weight of the chloride should contain about 59% chlorine; and a co-polymer containing 95% of polyvinyl chloride should contain about 61% of chlorine. By increasing the content of halogen in any of the co-polymers up to about 64%, further elevation of shrinkage temperatures results without serious losses of solubilities.

In accordance with this invention, the co-polymers of vinyl chloride with vinyl acetate in which the weight per cent of vinyl chloride falls in the range from 80 to 95, and preferably between 88 and 90, and which have molecular weights averaging 15,000 or more are dissolved in a suitable solvent, and the solution, to which a catalyst may be added, is heated to about 50 to 55° C., and subjected to the action of a halogen or a halogen generating substance for a time of the order of several hours, for example from about 5 to 15 hours.

Whenever possible, the halogenation of the co-polymer should be performed in a solution thereof since it has been found that halogenation of suspensions do not result in products as homogeneous (that is, as uniformly halogenated throughout their mass) as those obtained from solutions. This improved homogeneity results in products of correspondingly greater solubilities and higher shrinkage temperatures for corresponding total halogen contents and also in reducing the tendency to shrink at temperatures below the shrinkage temperature proper as defined hereinabove.

Benzoyl peroxide or any other organic peroxide, such as lauroyl peroxide, acetyl benzoyl peroxide, acetyl peroxide, peracetic acid, perbenzoic acid, and ascaridol, may be employed in small amounts as a catalyst for the reaction. It has been found that the use of the organic peroxide catalyst ensures a rapid and smooth reaction without the necessity to employ high temperature and pressure. Furthermore, no appreciable degradation, deacetylation or further polymerization accompanies the reaction when performed in the presence of the catalyst. This is unexpected in that even when such a catalyst is used for the halogenation of straight polyvinyl acetate resins, considerable degradation and deacetylation are found to occur. Chlorine, bromine or any halogen-generating material may be led into the solution of the co-polymer, and after the halogenation has been performed for a sufficient time to yield a product containing the desired amount of halogen to impart the higher shrinkage or softening range and improved solubility, the gaseous hydrogen chloride which is formed during the reaction is swept out of the reacted solution, such as by passing a stream of dry air therethrough.

The halogenated co-polymer is then precipitated from the solution, such as by pouring the solution into a large volume of a non-solvent for the resin which is preferably miscible with the solvent employed as the reaction medium. If desired, the precipitation may consist of the step of extruding the viscous reacted mass through a spinneret or other form of die into a suitable precipitating or coagulating medium. The extrusion may be accompanied by a stretching up to 200%. The precipitated resin, whether in the form of a flocculent precipitate or an extruded filament or sheet, is subjected to a washing and, if desired, then dried. The product, whether in the form of a powder, a filament or a sheet, may then be dissolved in a solvent suitable for wet-spinning or dry-spinning and is then subjected to spinning operations similar to those described in the Rugeley et al. Patent 2,161,766, June 6, 1939, with a modification of the after-stretching procedure, however. Whereas the after-stretching (that is, the stretching performed on the twisted and/or doubled thread) of the patent is performed upon the filaments in an unsoftened condition, it has been found that the after-stretching of the halogenated co-polymers should be performed while the filaments are subjected to temperatures well above their shrinkage temperatures, preferably about 40° to 50° C. above the shrinkage temperature. The after-stretching is preferably performed in such a manner that the filament continues to be subjected to the temperature just mentioned even after the stretching occurs. This treatment apparently has an annealing effect similar to that resulting from the analogous treatment disclosed in British Patent 513,327.

The following examples, in which the proportions are in parts by weight, are illustrative of the invention.

Example 1

100 parts of a co-polymer of vinyl chloride with vinyl acetate having a content of 90% of vinyl chloride and a molecular weight of 22,000 were dissolved in chloroform containing 2 parts of benzoyl peroxide. The solution was heated to 55° C. and dry chlorine gas was passed through the solution for 12 hours. A stream of dry air was passed through the mixture to rid it of hydrogen chloride, and the mixture was extruded through a spinneret into a bath of isopropanol. The resin thread was passed over suitable godets, being subjected to 5% of stretching and washing during its passage between the godets, and was then collected in a spinning box, these operations being performed in a manner analogous to that employed in the manufacture of viscose in accordance with the wet-spinning procedure. The thread was then air-dried. The thread composed of 40 filaments twisted together had a titer of 304 deniers, a content of 64.6% of chlorine, a molecular weight of 31,000 and a shrinkage temperature of 135° to 140° C. It was soluble to the extent of at least 6% in chloroform and at least 8% in dioxane, and insoluble in acetone and butanone.

Example 2

100 parts of a vinyl acetate co-polymer containing 90% vinyl chloride and having a molecular weight of 22,000 were dissolved in chloroform to which there were added 2 parts of benzoyl peroxide. This solution was heated to 50° C. and dried chlorine gas was passed therethrough for 5 hours. The reacted mixture was freed of hydrogen chloride, and was precipitated by pouring it into n-butanol, the precipitate being then washed and dried. The dried powder was then dissolved in chloroform, and was wet-spun into a bath of isopropyl alcohol, stretching of 38% being employed during the spinning. The spun thread was then washed, dried and after-stretched by 580% while being passed through steam at 159° C. It had a chlorine content of 60.7%, a shrinkage temperature range of about 110°–115° C., a strength of 3.5 grams per denier, and an extensibility in excess of 20%. It was soluble to the extent of at least 10% in acetone and butanone, at least 6% in chloroform, and at least 8% in dioxane.

*Example 3*

100 parts of a co-polymer containing 95% by weight of vinyl chloride and 5% of vinyl acetate was dispersed in carbon tetrachloride to which 3 parts of benzoyl peroxide were added. This dispersion was heated to 50° C. and dry chlorine was passed through it for 6 hours. During chlorination, the undissolved suspended particules went into solution. A gelled mass formed which was dissolved upon the addition of 100 parts of dioxane. Thereupon, the reaction mixture was poured into a mixture of isopropanol while stirring. The precipitated resin was washed and dried. The resin had a chlorine content of 62%, a molecular weight of 40,000 and a shrinkage temperature range of 110°–115° C. The resin was dissolved in dioxane at about 50° C. and was wet-spun into isopropanol as in Example 1 except that a stretch of 100% was employed during spinning. The resin was soluble to the extent of at least 10% in butanone, 6% in chloroform, and 8% in dioxane at a temperature of about 50° C.

*Example 4*

100 parts of a co-polymer of vinyl chloride with vinyl acetate having a content of 90% of vinyl chloride and a molecular weight of 22,000 were dissolved in chloroform containing 2 parts of benzoyl peroxide. The solution was heated to 55° C. and dry chlorine gas was introduced for 4 hours. After ridding the mixture of hydrogen chloride, the mass was extruded through a spinneret into a bath of isopropyl alcohol, being then passed over godets and collected in a spinning box. The extruded filament was stretched and washed between godets. The collected mass was then air-dried. The dried mass was dissolved in acetone and was dry-spun in a manner similar to that described in the Rugeley et al. patent supra, 15% stretch being applied during spinning and an after-stretch of 1070% being applied while the spun thread is passing through steam at 148° C. The resin thread had a strength of 3.2 grams per denier, an extensibility of 20%, and a shrinkage temperature of 100° to 105° C. It contained 58.8% chlorine and was soluble to the extent of at least 10% in acetone, 10% in butanone, 6% in chloroform, and 8% in dioxane.

The filaments of the halogenated co-polymers of any of the preceding examples may be cut into short lengths exhibiting an appearance, resilience, and handle similar to that of wool which may be felted or spun into a continuous thread.

While the preceding examples disclose particularly the making of filaments from the resins herein disclosed, the halogenated co-polymers may also be formed into other masses such as films, sheets, insulating materials, molded articles, wrapping sheets, and the like. Similarly, they may be dissolved in suitable solvents and used as lacquers, coating compositions, adhesives, and impregnating agents. In all of such compositions, pigments, fillers, plasticizing agents, etc. may be incorporated with the resins and when the resins are used in the manufacture of filaments, such adjuvants as delustrants, lubricants, pigments, fillers, plasticizers, sizing agents, and finishing agents may be incorporated in the resin either before or after it is converted into the filamentary form. The resins may be shaped and formed in the customary manner or manners well known to those skilled in the art and, as stated above, the spinning procedure disclosed in the Rugeley et al. patent is representative of the procedures which may be employed in producing filaments therefrom. The halogenated co-polymer resins of this invention are soluble to the extent of at least 6 to 10% in at least one solvent of the group including acetone, methyl ethyl ketone, chloroform, and dioxane and in many other solvents, such as s-dichlorethane, s-tetrachlorethane, and morpholine. Any of such solvents may be employed in preparing spinning solutions of such resins, the volatile solvents being applicable in both dry- and wet-spinning, while the non-volatile solvents are applicable to wet-spinning. In wet-spinning, such non-solvents as water, alcohols, such as isopropanol, n-butanol, n-hexanol, n-octanol, cyclohexanol, n-decanol, and hydrocarbons, such as petroleum ether, Sinclair Solvent (hydrocarbon fraction of petroleum boiling from 150–212° C.), Ultrasene (petroleum hydrocarbon fraction boiling from 260 to 280° C.), and cyclohexane, may be employed as the coagulating medium.

In accordance with the invention, the halogenation of the vinyl co-polymers may be carried out to any desired extent within the limitations hereinabove prescribed for the shrinkage temperatures and solubilities of the products. The extent of halogenation of any particular co-polymer depends to some degree upon its constitution, particularly the proportions in which the chloride and acetate are combined in the initial resin. For this reason, the exact limits of halogenation cannot be stated in simple fashion, since in the case of some of the co-polymers a proportion of chlorine in the final resin falling anywhere within the range from about 58 to 64% imparts to them a shrinkage temperature in excess of 100° C. together with improved solubility, while in other cases a proportion within the range from 59 to 62% chlorine is necessary to impart the desired properties. However, co-polymers having chlorine contents in excess of 64% are not precluded in view of the fact that resins having up to 66 to 70% or more chlorine having shrinkage temperatures of the order of 160–170° C. and higher are still soluble in chloroform and dioxane at somewhat elevated temperatures, such as 50–80° C. A preferred range applicable to all the various co-polymers is, therefore, a chlorine content from 59 to 62%. This range is especially preferred with the co-polymers having about 88 to 90% by weight of vinyl chloride since in such case modified co-polymers having solubility in the greatest number of the solvents mentioned hereinabove and having shrinkage temperatures well in excess of 100° C. are obtained. It may be noted at this point that the shrinkage temperature of the filament of Example 1 is about 30 to 35° C. higher than a chlorinated straight polyvinyl chloride yarn having a similar content of chlorine manufactured in accordance with prior art.

From the experimental results obtained, it has been found that the shrinkage temperatures of the filaments made of co-polymers of vinyl chloride and vinyl acetate obey the following general law:

$$T_c - T_u = kz \quad (1)$$

where $T_c$ is the shrinkage temperature in °C. of the chlorinated co-polymer, $T_u$ is the shrinkage temperature in °C. of the unchlorinated co-polymer, $z$ is the number of chlorine atoms introduced per monomer unit, and $k$ is a constant.

It can be established that:

$$Z = \frac{m_r(Cl_c - Cl_u)}{(x+1)(35.46 - 34.46 Cl_c)} \quad (2)$$

where $m_r$ is the molecular weight of the unmodified repeating unit of the co-polymer, $x$ is the number of vinyl chloride units per vinyl acetate unit in the repeating unit, $Cl_c$ is the weight proportion of chlorine in the chlorinated co-polymer, and $Cl_u$ is the weight proportion of chlorine in the unchlorinated co-polymer.

Substituting (2) in (1) and rearranging, the following general equation results:

$$T_c = k \frac{m_r(Cl_c - Cl_u)}{(x+1)(35.46 - 34.46 Cl_c)} + T_u$$

For the co-polymer comprising 88% of vinyl chloride, $m_r = 751.5$, $Cl_u = 0.503$, and $x = 10.65$, and from the experimental results it has been found that $k = 103$. Therefore, for this specific co-polymer, the equation becomes:

$$T_c = 6644 \left[ \frac{Cl_c - 0.503}{35.46 - 34.46 Cl_c} \right] + T_u$$

For the co-polymer comprising 90% of vinyl chloride, $k = 106$, and equation becomes:

$$T_c = 6809 \left[ \frac{Cl_c - 0.5111}{35.46 - 34.46 Cl_c} \right] + T_u$$

For the co-polymer comprising 95% of vinyl chloride, $k = 130$, and the equation becomes:

$$T_c = 8235 \left[ \frac{Cl_c - .5392}{35.46 - 34.46 Cl_c} \right] + T_u$$

Similar equations can be derived for any other specific co-polymer. They provide a ready means for determining what proportion of chlorine is necessary to be introduced ($Cl_c - Cl_u$) in order to obtain a desired shrinkage temperature $T_c$ from a co-polymer having an initial shrinkage temperature $T_u$. The initial shrinkage temperature can readily be established experimentally and depends upon the constitution of the co-polymer.

While preferred embodiments of the invention have been disclosed, the description is intended to be illustrative only, and it is to be understood that changes and variations may be made without departing from the spirit or scope of the invention as defined by the appended claims.

What we claim is:

1. A co-polymer of vinyl chloride and vinyl acetate containing a proportion of vinyl chloride within the range from about 80 to about 95% by weight and combined chlorine in addition to that normally present in the simple co-polymer to constitute a total chlorine content of about 58% up to about 64% by weight, said chlorinated co-polymer having a shrinkage temperature over 100° C., having a molecular weight of at least 15,000.

2. A co-polymer of vinyl chloride and vinyl acetate containing a proportion of vinyl chloride within the range of about 88 to 90% by weight and combined chlorine in addition to that normally present in the simple co-polymer to constitute a total chlorine content of between about 59% and about 62% by weight, said chlorinated co-polymer having a shrinkage temperature over 100° C., having a molecular weight of at least 15,000.

3. A filament formed of a co-polymer of vinyl chloride and vinyl acetate containing a proportion of vinyl chloride within the range from about 80% to about 95% by weight and combined chlorine in addition to that normally present in the simple co-polymer to constitute a total chlorine content of between about 58 to 64% by weight, said chlorinated co-polymer having a shrinkage temperature over 100° C., and a molecular weight of at least 15,000.

4. A filament formed of a co-polymer of vinyl chloride and vinyl acetate containing a proportion of vinyl chloride within the range of about 88 to 90% by weight and combined chlorine in addition to that normally present in the simple co-polymer to constitute a total chlorine content of between about 59% and about 62% by weight, said chlorinated co-polymer having a shrinkage temperature over 100° C., and a molecular weight of at least 15,000.

5. In a process of treating a co-polymer of a vinyl halide and a vinyl ester of an aliphatic monocarboxylic acid, the steps of forming a solution thereof and subjecting said solution to a halogen in the presence of an organic peroxide catalyst.

6. In a process of treating a co-polymer of vinyl chloride and vinyl acetate, the steps of forming a solution thereof, and subjecting said solution to the action of chlorine in the presence of an organic peroxide catalyst.

7. In a process of treating a co-polymer of vinyl chloride and vinyl acetate, the steps of forming a solution thereof, and subjecting said solution to the action of chlorine in the presence of an organic peroxide catalyst at a temperature of the order of 50° C.

8. In a process of treating a co-polymer of vinyl chloride and vinyl acetate, the steps of forming a solution thereof, and subjecting said solution to the action of chlorine in the presence of benzoyl peroxide at a temperature of the order of 50° C.

9. A stretched filament formed of a co-polymer of vinyl chloride and vinyl acetate containing a proportion of vinyl chloride within the range from about 80% to about 95% by weight and combined chlorine in addition to that normally present in the simple co-polymer to constitute a total chlorine content of between about 58 to 64% by weight, said chlorinated co-polymer having a shrinkage temperature over 100° C., and a molecular weight of at least 15,000.

10. A stretched filament formed of a co-polymer of vinyl chloride and vinyl acetate containing a proportion of vinyl chloride within the range of about 88 to 90% by weight and combined chlorine in addition to that normally present in the simple co-polymer to constitute a total chlorine content of between about 59% and about 62% by weight, said chlorinated co-polymer having a shrinkage temperature over 100° C., and a molecular weight of at least 15,000.

MARION R. LYTTON.
ROBERT J. TAYLOR.